(12) United States Patent
Thorstensen-Woll (10) Patent No.: US 11,866,242 B2
(45) Date of Patent: Jan. 9, 2024

(54) TABBED INNER SEAL (71) Applicant: Selig Sealing Products, Inc., Forrest, IL (US)

(72) Inventor: Robert William Thorstensen-Woll, Barrie (CA)

(73) Assignee: Selig Sealing Products, Inc., Forrest, IL (US)

( * ) Notice: Subject to any disclaimer, the term of this patent is extended or adjusted under 35 U.S.C. 154(b) by 623 days.

(21) Appl. No.: 15/794,719

(22) Filed: Oct. 26, 2017

(65) Prior Publication Data

US 2018/0118439 A1 May 3, 2018

Related U.S. Application Data

(60) Provisional application No. 62/415,351, filed on Oct. 31, 2016.

(51) Int. Cl.
| | |
|---|---|
| B32B 5/18 | (2006.01) |
| B65D 77/20 | (2006.01) |
| B32B 3/28 | (2006.01) |
| B32B 27/06 | (2006.01) |
| B32B 27/30 | (2006.01) |
| B32B 27/32 | (2006.01) |
| B32B 27/36 | (2006.01) |
| B32B 27/08 | (2006.01) |

(52) U.S. Cl.
CPC .......... *B65D 77/2044* (2013.01); *B32B 3/28* (2013.01); *B32B 5/18* (2013.01); *B32B 27/065* (2013.01); *B32B 27/08* (2013.01); *B32B 27/302* (2013.01); *B32B 27/32* (2013.01); *B32B 27/36* (2013.01); *B32B 2581/00* (2013.01); *B65D 2577/205* (2013.01)

(58) Field of Classification Search
CPC .......... B65D 77/2044; B32B 3/28; B32B 5/18
See application file for complete search history.

(56) References Cited

U.S. PATENT DOCUMENTS

| | | | |
|---|---|---|---|
| 1,818,379 | A | 8/1931 | Cain |
| 2,768,762 | A | 10/1956 | Guinet |
| 3,235,165 | A | 2/1966 | Jackson |
| 3,292,828 | A | 12/1966 | Stuart |
| 3,302,818 | A | 2/1967 | Balocca et al. |
| 3,460,310 | A | 8/1969 | Adcock et al. |
| 3,556,816 | A | 1/1971 | Nughes |
| 3,964,670 | A | 6/1976 | Amneus |
| 3,990,603 | A | 11/1976 | Brochman |
| 4,133,796 | A | 1/1979 | Bullman |
| 4,206,165 | A | 6/1980 | Dukess |
| 4,266,687 | A | 5/1981 | Cummings |
| 4,396,655 | A | 8/1983 | Graham |

(Continued)

FOREIGN PATENT DOCUMENTS

| | | | |
|---|---|---|---|
| AT | | 501393 A1 | 8/2006 |
| AT | | 11738 U1 | 4/2011 |

(Continued)

*Primary Examiner* — Tong Guo
(74) *Attorney, Agent, or Firm* — Fitch, Even, Tabin & Flannery, LLP (57) ABSTRACT

A pull-tab sealing member for a container is provided having a pressure sensitive adhesive for sealing to the container. The sealing members herein include a foam layer and a non-foam polymer layer between the foam layer and a tab.

25 Claims, 2 Drawing Sheets

(56) References Cited

U.S. PATENT DOCUMENTS

| | | | |
|---|---|---|---|
| 4,556,590 A | 12/1985 | Martin | |
| 4,582,735 A | 4/1986 | Smith | |
| 4,588,099 A | 5/1986 | Diez | |
| 4,595,116 A | 6/1986 | Carlsson | |
| 4,596,338 A | 6/1986 | Yousif | |
| 4,636,273 A | 1/1987 | Wolfersperger | |
| 4,666,052 A | 5/1987 | Ou-Yang | |
| 4,693,390 A | 9/1987 | Hekal | |
| 4,735,335 A | 4/1988 | Torterotot | |
| 4,741,791 A | 5/1988 | Howard | |
| 4,762,246 A | 8/1988 | Ashley | |
| 4,770,325 A | 9/1988 | Gordon | |
| 4,771,903 A | 9/1988 | Levene | |
| 4,781,294 A | 11/1988 | Croce | |
| 4,801,647 A | 1/1989 | Wolfe, Jr. | |
| 4,811,856 A | 3/1989 | Fischman | |
| 4,818,577 A | 4/1989 | Ou-Yang | |
| 4,837,061 A | 6/1989 | Smits | |
| 4,863,061 A | 9/1989 | Moore | |
| 4,867,881 A | 9/1989 | Kinzer | |
| 4,889,731 A | 12/1989 | Williams | |
| 4,917,949 A | 4/1990 | Yousif | |
| 4,934,544 A | 6/1990 | Han | |
| 4,938,390 A | 7/1990 | Markva | |
| 4,960,216 A | 10/1990 | Giles | |
| 4,961,986 A | 10/1990 | Galda | |
| 5,004,111 A | 4/1991 | McCarthy | |
| 5,012,946 A | 5/1991 | Mccarthy | |
| 5,015,318 A | 5/1991 | Smits | |
| 5,053,457 A | 10/1991 | Lee | |
| 5,055,150 A | 10/1991 | Rosenfeld | |
| 5,057,365 A | 10/1991 | Finkelstein | |
| 5,071,710 A | 12/1991 | Smits | |
| 5,089,320 A * | 2/1992 | Straus | B32B 7/06 428/216 |
| 5,098,495 A | 3/1992 | Smits | |
| RE33,893 E | 4/1992 | Elias | |
| 5,106,124 A | 4/1992 | Volkman | |
| 5,125,529 A | 6/1992 | Torterotot | |
| 5,131,556 A | 7/1992 | Iioka | |
| 5,149,386 A | 9/1992 | Smits | |
| 5,178,967 A | 1/1993 | Rosenfeld | |
| 5,197,618 A | 3/1993 | Goth | |
| 5,217,790 A | 6/1993 | Galda | |
| 5,226,281 A | 7/1993 | Han | |
| 5,261,990 A | 11/1993 | Galda | |
| 5,265,745 A | 11/1993 | Pereyra | |
| 5,433,992 A | 7/1995 | Galda | |
| 5,513,781 A | 5/1996 | Ullrich | |
| 5,514,442 A | 5/1996 | Galda | |
| 5,560,989 A | 10/1996 | Han | |
| 5,598,940 A | 2/1997 | Finkelstein | |
| 5,601,200 A | 2/1997 | Finkelstein | |
| 5,615,789 A | 4/1997 | Finkelstein | |
| 5,618,618 A | 4/1997 | Murschall | |
| 5,669,521 A | 9/1997 | Wiening | |
| 5,683,774 A | 11/1997 | Faykish | |
| 5,702,015 A | 12/1997 | Giles | |
| 5,709,310 A | 1/1998 | Kretz | |
| 5,776,284 A | 7/1998 | Sykes | |
| 5,851,333 A | 12/1998 | Fagnant | |
| 5,860,544 A | 1/1999 | Brucker | |
| 5,871,112 A | 2/1999 | Giles | |
| 5,887,747 A | 3/1999 | Burklin | |
| 5,915,577 A | 6/1999 | Levine | |
| 5,975,304 A | 11/1999 | Cain | |
| 5,976,294 A | 11/1999 | Fagnant | |
| 6,056,141 A | 5/2000 | Navarini | |
| 6,082,566 A | 7/2000 | Yousif | |
| 6,096,358 A | 8/2000 | Murdick | |
| 6,131,754 A | 10/2000 | Smelko | |
| 6,139,931 A | 10/2000 | Finkelstein | |
| 6,158,632 A | 12/2000 | Ekkert | |
| 6,194,042 B1 | 2/2001 | Finkelstein | |
| 6,234,386 B1 | 5/2001 | Drummond | |
| 6,290,801 B1 | 9/2001 | Krampe | |
| 6,312,776 B1 | 11/2001 | Finkelstein | |
| 6,361,856 B1 * | 3/2002 | Wakai | B32B 27/32 428/220 |
| 6,378,715 B1 | 4/2002 | Finkelstein | |
| 6,458,302 B1 | 10/2002 | Shifflet | |
| 6,461,714 B1 | 10/2002 | Giles | |
| 6,544,615 B2 | 4/2003 | Otten | |
| 6,548,302 B1 | 4/2003 | Mao | |
| 6,602,309 B2 | 8/2003 | Vizulis | |
| 6,627,273 B2 | 9/2003 | Wolf | |
| 6,635,137 B2 | 10/2003 | Giles | |
| 6,669,046 B1 | 12/2003 | Sawada | |
| 6,699,566 B2 | 3/2004 | Zeiter | |
| 6,705,467 B1 | 3/2004 | Kancsar | |
| 6,722,272 B2 | 4/2004 | Jud | |
| 6,767,425 B2 | 7/2004 | Meier | |
| 6,790,508 B2 | 9/2004 | Razeti | |
| 6,866,926 B1 | 3/2005 | Smelko | |
| 6,902,075 B2 | 6/2005 | OBrien | |
| 6,916,516 B1 | 7/2005 | Gerber | |
| 6,955,736 B2 | 10/2005 | Rosenberger | |
| 6,959,832 B1 | 11/2005 | Sawada | |
| 6,974,045 B1 | 12/2005 | Trombach | |
| 6,986,930 B2 | 1/2006 | Giles | |
| 7,128,210 B2 | 10/2006 | Razeti | |
| 7,182,475 B2 | 2/2007 | Kramer | |
| 7,217,454 B2 | 5/2007 | Smelko | |
| RE39,790 E | 8/2007 | Fuchs | |
| 7,316,760 B2 | 1/2008 | Nageli | |
| 7,448,153 B2 | 11/2008 | Maliner | |
| 7,531,228 B2 | 5/2009 | Perre | |
| 7,648,764 B2 | 1/2010 | Yousif | |
| 7,713,605 B2 | 5/2010 | Yousif | |
| 7,731,048 B2 | 6/2010 | Teixeira Alvares | |
| 7,740,730 B2 | 6/2010 | Schedl | |
| 7,740,927 B2 | 6/2010 | Yousif | |
| 7,757,879 B2 | 7/2010 | Schuetz | |
| 7,789,262 B2 | 9/2010 | Niederer | |
| 7,798,359 B1 | 9/2010 | Marsella | |
| 7,819,266 B2 | 10/2010 | Ross | |
| 7,838,109 B2 | 11/2010 | Declerck | |
| 7,850,033 B2 | 12/2010 | Thorstensen-Woll | |
| 8,025,171 B2 | 9/2011 | Cassol | |
| 8,057,896 B2 | 11/2011 | Smelko | |
| 8,129,009 B2 | 3/2012 | Morris | |
| 8,201,385 B2 | 6/2012 | McLean | |
| 8,308,003 B2 | 11/2012 | O'Brien | |
| 8,329,288 B2 | 12/2012 | Allegaert | |
| 8,348,082 B2 | 1/2013 | Cain | |
| 8,455,071 B2 | 6/2013 | Lo | |
| 8,541,081 B1 | 9/2013 | Ranganathan | |
| 8,703,265 B2 | 4/2014 | Thorstensen-Woll | |
| 8,715,825 B2 * | 5/2014 | Thorstensen-Woll | B65D 77/2032 428/347 |
| 8,852,725 B2 | 10/2014 | Sachs | |
| 8,906,185 B2 | 12/2014 | McLean | |
| 8,944,264 B2 | 2/2015 | Frishman | |
| 9,028,963 B2 | 5/2015 | Thorstensen-Woll | |
| 9,102,438 B2 | 8/2015 | Thorstensen-Woll | |
| 9,193,513 B2 * | 11/2015 | Thorstensen-Woll | B32B 15/04 |
| 9,221,579 B2 * | 12/2015 | Thorstensen-Woll | B65D 17/50 |
| 9,227,755 B2 | 1/2016 | Thorstensen-Woll | |
| 9,278,506 B2 | 3/2016 | Mclean | |
| 9,278,793 B2 | 3/2016 | Thorstensen-Woll | |
| 9,440,765 B2 | 9/2016 | Thorstensen-Woll | |
| 9,440,768 B2 | 9/2016 | Thorstensen-Woll | |
| 9,533,805 B2 | 1/2017 | McLean | |
| 9,676,513 B2 | 6/2017 | Thorstensen-Woll | |
| 9,834,339 B2 | 12/2017 | Brucker | |
| 9,956,741 B2 | 5/2018 | Planchard | |
| 9,994,357 B2 | 6/2018 | Thorstensen-Woll | |
| 10,000,310 B2 | 6/2018 | Thorstensen-Woll | |
| 10,150,590 B2 | 12/2018 | Thorstensen-Woll | |
| 10,196,174 B2 | 2/2019 | Thorstensen-Woll | |
| 10,259,626 B2 | 4/2019 | Thorstensen-Woll | |

(56) References Cited

U.S. PATENT DOCUMENTS

| | | |
|---|---|---|
| 10,556,732 B2 | 2/2020 | Cassidy |
| 10,604,315 B2 | 3/2020 | Thorstensen-Woll |
| 10,899,506 B2 | 1/2021 | Thorstensen-Woll |
| 10,934,069 B2 | 3/2021 | Clark |
| 10,954,032 B2 | 3/2021 | Thorstensen-Woll |
| 11,059,644 B2 | 7/2021 | Cassidy |
| 2001/0023870 A1 | 9/2001 | Mihalov |
| 2001/0031348 A1 | 10/2001 | Jud |
| 2002/0028326 A1 | 3/2002 | Lhila |
| 2002/0068140 A1 | 6/2002 | Finkelstein |
| 2003/0087057 A1 | 5/2003 | Blemberg |
| 2003/0108714 A1 | 6/2003 | Razeti |
| 2003/0168423 A1 | 9/2003 | Williams |
| 2003/0196418 A1 | 10/2003 | O'Brien |
| 2004/0013862 A1 | 1/2004 | Brebion |
| 2004/0028851 A1 | 2/2004 | Okhai |
| 2004/0043165 A1* | 3/2004 | Van Hulle ................. B32B 7/12 428/34.2 |
| 2004/0043238 A1 | 3/2004 | Wuest |
| 2004/0109963 A1 | 6/2004 | Zaggia |
| 2004/0197500 A9 | 10/2004 | Swoboda |
| 2004/0211320 A1 | 10/2004 | Cain |
| 2005/0003155 A1 | 1/2005 | Huffer |
| 2005/0048307 A1 | 3/2005 | Schubert |
| 2005/0100718 A1 | 5/2005 | Peiffer |
| 2005/0208242 A1* | 9/2005 | Smelko ................... B32B 27/08 428/35.7 |
| 2005/0208244 A1 | 9/2005 | Delmas |
| 2005/0218143 A1 | 10/2005 | Niederer |
| 2005/0279814 A1 | 12/2005 | Drummond |
| 2006/0000545 A1 | 1/2006 | Nageli |
| 2006/0003120 A1 | 1/2006 | Nageli |
| 2006/0003122 A1 | 1/2006 | Nageli |
| 2006/0068163 A1 | 3/2006 | Giles |
| 2006/0124577 A1 | 6/2006 | Ross |
| 2006/0151415 A1 | 7/2006 | Smelko |
| 2006/0278665 A1 | 12/2006 | Bennett |
| 2007/0003725 A1 | 1/2007 | Yousif |
| 2007/0007229 A1* | 1/2007 | Yousif ..................... B29C 65/76 215/232 |
| 2007/0014897 A1 | 1/2007 | Ramesh |
| 2007/0065609 A1 | 3/2007 | Korson |
| 2007/0267304 A1 | 11/2007 | Portier |
| 2007/0298273 A1 | 12/2007 | Thies |
| 2008/0026171 A1 | 1/2008 | Gullick |
| 2008/0073308 A1 | 3/2008 | Yousif |
| 2008/0103262 A1 | 5/2008 | Haschke |
| 2008/0135159 A1 | 6/2008 | Bries |
| 2008/0145581 A1 | 6/2008 | Tanny |
| 2008/0156443 A1 | 7/2008 | Schaefer |
| 2008/0169286 A1 | 7/2008 | McLean |
| 2008/0231922 A1 | 9/2008 | Thorstensen-Woll |
| 2008/0233339 A1 | 9/2008 | Thorstensen-Woll |
| 2008/0233424 A1 | 9/2008 | Thorstensen-Woll |
| 2009/0078671 A1 | 3/2009 | Triquet |
| 2009/0208729 A1 | 8/2009 | Allegaert |
| 2009/0304964 A1 | 12/2009 | Sachs |
| 2010/0009162 A1 | 1/2010 | Rothweiler |
| 2010/0030180 A1 | 2/2010 | Deckerck |
| 2010/0047552 A1 | 2/2010 | McLean |
| 2010/0059942 A1 | 3/2010 | Rothweiler |
| 2010/0116410 A1 | 5/2010 | Yousif |
| 2010/0155288 A1 | 6/2010 | Harper |
| 2010/0170820 A1 | 7/2010 | Leplatois |
| 2010/0193463 A1 | 8/2010 | OBrien |
| 2010/0213193 A1 | 8/2010 | Helmlinger |
| 2010/0221483 A1 | 9/2010 | Gonzalez Carro |
| 2010/0279041 A1 | 11/2010 | Mathew |
| 2010/0290663 A1 | 11/2010 | Trassl |
| 2010/0314278 A1 | 12/2010 | Fonteyne |
| 2011/0000917 A1 | 1/2011 | Wolters |
| 2011/0005961 A1 | 1/2011 | Leplatois |
| 2011/0089177 A1 | 4/2011 | Thorstensen-Woll |
| 2011/0091715 A1 | 4/2011 | Rakutt |
| 2011/0100949 A1 | 5/2011 | Grayer |
| 2011/0100989 A1 | 5/2011 | Cain |
| 2011/0138742 A1 | 6/2011 | McLean |
| 2011/0147353 A1 | 6/2011 | Kornfeld |
| 2011/0152821 A1 | 6/2011 | Kornfeld |
| 2012/0000910 A1 | 1/2012 | Ekkert |
| 2012/0043330 A1 | 2/2012 | McLean |
| 2012/0067896 A1 | 3/2012 | Daffner |
| 2012/0070636 A1* | 3/2012 | Thorstensen-Woll ....................... B65D 77/2032 428/200 |
| 2012/0103988 A1 | 5/2012 | Wiening |
| 2012/0111758 A1* | 5/2012 | Lo ........................... B65D 51/22 206/524.6 |
| 2012/0241449 A1 | 9/2012 | Frischmann |
| 2012/0285920 A1 | 11/2012 | McLean |
| 2012/0288693 A1 | 11/2012 | Stanley |
| 2012/0312818 A1 | 12/2012 | Ekkert |
| 2013/0020324 A1 | 1/2013 | Thorstensen-Woll |
| 2013/0020328 A1 | 1/2013 | Duan |
| 2013/0045376 A1 | 2/2013 | Chen |
| 2013/0121623 A1 | 5/2013 | Lyzenga |
| 2013/0177263 A1 | 7/2013 | Duan |
| 2013/0248410 A9 | 9/2013 | Spallek |
| 2014/0001185 A1 | 1/2014 | McLean |
| 2014/0061196 A1* | 3/2014 | Thorstensen-Woll ....................... B65D 77/10 220/270 |
| 2014/0061197 A1* | 3/2014 | Thorstensen-Woll ....................... B32B 15/04 220/359.2 |
| 2014/0186589 A1 | 7/2014 | Chang |
| 2014/0224800 A1 | 8/2014 | Thorstensen-Woll |
| 2014/0284331 A1 | 9/2014 | Thorstensen-Woll |
| 2015/0053680 A1 | 2/2015 | Yuno |
| 2015/0131926 A1* | 5/2015 | Lux ........................ B65D 33/24 383/89 |
| 2015/0158643 A1 | 6/2015 | Coker |
| 2015/0197385 A1 | 7/2015 | Wei |
| 2015/0225116 A1* | 8/2015 | Thorstensen-Woll ....................... B65D 17/50 220/258.2 |
| 2015/0321808 A1 | 11/2015 | Thorstensen-Woll |
| 2016/0001952 A1 | 1/2016 | Kulkarni |
| 2016/0159546 A1 | 6/2016 | Cassidy |
| 2016/0185485 A1 | 6/2016 | Thorstensen-Woll |
| 2016/0325896 A1 | 11/2016 | Thorstensen-Woll |
| 2017/0173930 A1 | 6/2017 | Mclean |
| 2017/0253373 A1 | 9/2017 | Thorstensen-Woll |
| 2017/0259978 A1 | 9/2017 | Zamora |
| 2017/0291399 A1 | 10/2017 | Bourgeois |
| 2018/0079576 A1 | 3/2018 | Cassidy |
| 2018/0186122 A1 | 7/2018 | Bourgeois |
| 2019/0055070 A1 | 2/2019 | Brown |
| 2019/0092520 A1 | 3/2019 | Thorstensen-Woll |
| 2019/0225369 A1 | 7/2019 | Thorstensen-Woll |
| 2019/0276209 A1 | 9/2019 | Clark |
| 2020/0079561 A1 | 3/2020 | Zamora |
| 2020/0087056 A1 | 3/2020 | Bosetti |
| 2020/0216256 A1 | 7/2020 | Miozzo |
| 2020/0282708 A1 | 9/2020 | Leuer |
| 2021/0188489 A1 | 6/2021 | Thorstensen-Woll |
| 2021/0237951 A1 | 8/2021 | Ostergren |
| 2021/0292059 A1 | 9/2021 | Thorstensen-Woll |
| 2021/0292060 A1 | 9/2021 | Thorstensen-Woll |

FOREIGN PATENT DOCUMENTS

| | | |
|---|---|---|
| BR | 8200231 U | 9/2003 |
| BR | 0300992 A | 11/2004 |
| CA | 2015992 A1 | 1/1991 |
| CA | 2203744 A1 | 10/1997 |
| CA | 2297840 A1 | 2/1999 |
| CN | 1301289 A | 6/2001 |
| CN | 1639020 A | 7/2005 |
| CN | 103193026 A | 7/2013 |
| CN | 104853994 A | 8/2015 |
| DE | 102006030118 B3 | 5/2007 |
| DE | 10204281 A1 | 8/2007 |

(56) References Cited

FOREIGN PATENT DOCUMENTS

| | | |
|---|---|---|
| DE | 102007022935 B4 | 4/2009 |
| DE | 202009000245 U1 | 4/2009 |
| EP | 0135431 A1 | 3/1985 |
| EP | 0577432 A1 | 1/1994 |
| EP | 0668221 A1 | 8/1995 |
| EP | 0826598 A2 | 3/1998 |
| EP | 0826599 A2 | 3/1998 |
| EP | 0905039 A1 | 3/1999 |
| EP | 0717710 B1 | 4/1999 |
| EP | 0915026 A1 | 5/1999 |
| EP | 0706473 B1 | 8/1999 |
| EP | 1075921 A2 | 2/2001 |
| EP | 1199253 A2 | 4/2002 |
| EP | 0803445 B1 | 11/2003 |
| EP | 1462381 A1 | 9/2004 |
| EP | 1199253 B1 | 3/2005 |
| EP | 1577226 A1 | 9/2005 |
| EP | 1814744 A1 | 8/2007 |
| EP | 1834893 A1 | 9/2007 |
| EP | 1837288 A1 | 9/2007 |
| EP | 1839898 A1 | 10/2007 |
| EP | 1839899 A1 | 10/2007 |
| EP | 1857275 A1 | 11/2007 |
| EP | 1873078 A1 | 1/2008 |
| EP | 1445209 B1 | 5/2008 |
| EP | 1918094 A1 | 5/2008 |
| EP | 1935636 A1 | 6/2008 |
| EP | 1968020 A1 | 9/2008 |
| EP | 1992476 A1 | 11/2008 |
| EP | 2014461 A1 | 1/2009 |
| EP | 2230190 A1 | 9/2010 |
| EP | 2292524 A1 | 3/2011 |
| EP | 2599735 A1 | 6/2013 |
| EP | 2230190 B1 | 8/2014 |
| EP | 3278972 B1 | 10/2020 |
| FR | 2693986 A1 | 1/1994 |
| FR | 2916157 A1 | 11/2008 |
| FR | 2943322 A1 | 9/2010 |
| GB | 1216991 A | 12/1970 |
| GB | 2353986 A | 3/2001 |
| GB | 2501967 A | 11/2013 |
| JP | H09110077 A | 4/1997 |
| JP | 2004212778 A | 7/2004 |
| JP | 2014015249 | 1/2014 |
| KR | 100711073 B1 | 4/2007 |
| KR | 100840926 B1 | 6/2008 |
| KR | 100886955 B1 | 3/2009 |
| MX | 05002905 A | 2/2006 |
| MX | 2010001867 A | 4/2010 |
| TW | 201217237 A | 5/2012 |
| WO | 9702997 A1 | 1/1997 |
| WO | 9905041 A1 | 2/1999 |
| WO | 0066450 A1 | 11/2000 |
| WO | 2005009868 A1 | 2/2005 |
| WO | 2005030860 A1 | 4/2005 |
| WO | 2006018556 A1 | 2/2006 |
| WO | 2006021291 A1 | 3/2006 |
| WO | 2006073777 A1 | 7/2006 |
| WO | 2006108853 A1 | 10/2006 |
| WO | 2008027029 A2 | 3/2008 |
| WO | 2008027036 A1 | 3/2008 |
| WO | 2008039350 A2 | 4/2008 |
| WO | 2008113855 A1 | 9/2008 |
| WO | 2008118569 A2 | 10/2008 |
| WO | 2008125784 A1 | 10/2008 |
| WO | 2008125785 A1 | 10/2008 |
| WO | 2008148176 A1 | 12/2008 |
| WO | 2009092066 A2 | 7/2009 |
| WO | 2010115811 A1 | 10/2010 |
| WO | 2011039067 A1 | 4/2011 |
| WO | 2012079971 A1 | 6/2012 |
| WO | 2012113530 A1 | 8/2012 |
| WO | 2012152622 A1 | 11/2012 |
| WO | 2012172029 A1 | 12/2012 |
| WO | 2013134665 A1 | 9/2013 |
| WO | 2014190395 A1 | 12/2014 |
| WO | 2015119988 A1 | 8/2015 |
| WO | 2016203251 A1 | 12/2016 |
| WO | 2017155946 A1 | 9/2017 |
| WO | 2018081419 | 5/2018 |

* cited by examiner

FIG. 5

TABBED INNER SEAL

CROSS-REFERENCE TO RELATED APPLICATIONS

This application claims the benefit of U.S. Provisional Application No. 62/415,351, filed Oct. 31, 2016.

FIELD

The disclosure relates to a pull-tab sealing member for sealing the mouth of a container, and more particularly, to a pull-tab sealing member having a pressure activated adhesive for sealing to the container.

BACKGROUND

It is often desirable to seal the opening of a bottle, jar or other container opening using a sealing member or inner seal to maintain freshness and/or to indicate whether the container has been tampered with. Often a cap or other closure is then screwed or placed on the neck or other container opening. In use, a consumer typically removes the cap or other closure to gain access to the seal and removes or otherwise peels the seal from the container in order to dispense or gain access to its contents.

Initial attempts at sealing a container opening included an induction- or conduction-type inner seal covering the container's opening where the seal generally conformed to the shape of the opening such that a circular container opening was sealed with a round disk approximately the same size as the opening. These prior seals commonly had a lower heat activated sealing layer to secure a periphery of the seal to a rim or upper surface surrounding a container's opening. Upon exposing the seal to heat, the lower layer bonds to the container rim. In many cases, these seals included a foil layer to provide induction heat to activate the lower heat seal layer.

Other types of seals for containers include a side tab or other flange that extends outwardly from a peripheral edge of the seal. These side tabs are generally not secured to the container rim and provide a grasping surface for a consumer to hold and peel off the seal. These side tabs, however, extend over the side of the container rim and often protrude into a threaded portion of the closure. If the side tab is too large, this configuration may negatively affect the ability of the seal to form a good seal. The side tabs (and often the seal itself) can be deformed or wrinkled when the closure or other cap is placed on the container due to contact between the closure and tabbed part of the seal. To minimize these concerns, the side tabs are often very small; thus, providing little surface area or material for a consumer to grasp in order to remove the seal.

Yet other types of seals include a sealing member having a tab defined on the top of the seal. One approach of these prior seals includes a partial layer of coated pressure sensitive adhesive to secure the tab to a layer of metal foil. This type of top-tabbed seal offers the advantage of a larger tab, which provides more grasping area for the consumer to hold and peel off the seal. These seals, however, have a non-uniform cross-section between the tabbed and non-tabbed sides of the seal because of the part layer of pressure sensitive adhesive. This non-uniform cross-section tends to cause problems when heat sealing to the container via an induction or conduction process. If sufficient heat is applied to activate the lower heat activated sealing layer on the tabbed side of the seal, then due to the additional layers on the non-tabbed side of the seal (i.e., the additional adhesive layer), the non-tabbed side often does not receive enough heat to adequately bond to the container.

Conversely, if additional heating is applied in order to insure that both sides of the seal receive sufficient heat for bonding to the container rim, then the tabbed side of the seal often receives too much heat resulting in too strong of a bond to the container. If a portion of the lower heat activated sealing layer is bonded to the container too strongly, this heat-seal/container bond can exceed the bond strength of the adhesive holding the tab to the lower seal layers or even the tear strength of the tab material itself. This undesirable situation can result in the tab tearing or the tab separating from the lower seal layers upon a consumer using the tab to remove the seal. In other approaches, the seal may include a part paper or polymer layer forming the tab. This part layer may also form a non-uniform seal between the tabbed and non-tabbed sides. The part layer tends to provide extra insulation, which also leads to non-uniform heat seal bonding between the tabbed and non-tabbed sides of the seal.

Some top-tabbed-type seals may further include a foam layer in the lower seal portion. However, while the foam layer may be advantageous in providing better seal performance, the foam layer is a weak point in the seal structure. In these cases, the foam layer typically needs to withstand the removal forces experienced on the lower portions of the seal upon tab pulling. During seal removal with the tab, these forces are caused by the tab pulling upwardly on the foam layer and because the tab is partially bonded to the foam. This stress is often exaggerated when a seal is aggressively applied to a container rim due to over sealing or in some circumstances where a stronger bond to the container may be needed. In such case, the consumer is then required to apply even a greater removal force to the tab. These prior seals with foam layers have a stress or failure point where the foam layer can split internally or the bond between the foam and upper seal layers can rupture resulting in tab and/or seal failure in some cases. In many cases, and especially when the seal is over sealed or aggressively sealed to a container, the foam layer under the tab becomes a weaker link in the overall seal structure and a stress point prone to possible failure when exposed to removal forces.

DETAILED DESCRIPTION

A pull-tab sealing member for a container is described herein containing an upper laminate having a pull-tab bonded to a lower laminate capable of being heat sealed to a container's mouth or opening. The pull-tab sealing members herein combine the advantages of an insulation or foamed polymer layer for effective sealing together with an overall laminate structure having a higher internal strength even with the use of the foamed polymer layer. The sealing members herein are capable of withstanding higher removal forces that tend to be inherent when the seal is aggressively sealed to a container. Such dual functionalities (insulation for better sealing and high total internal strength even with a foamed layer) are achieved in part because the sealing members herein have a laminate structure that incorporates numerous different polymer layers to provide greater total internal seal strength and avoid rupture of a foam layer.

In one aspect, the sealing members herein include a pull or grip tab defined in the upper laminate portion wholly within a perimeter of the sealing member combined with an insulation layer forming part of the sealing member. The foamed polymer layer is selected and positioned in the laminate effective to provide support for sealing and, at the same time, protection of a stress point (during seal removal) with a layer that provides a higher maximum stress before seal rupture or failure, such as in the case of over sealing or removal by an end user. Even with an overall laminate with much greater maximum stress before failure, the sealing members herein can also use a foamed polymer layer with lower internal rupture forces than used in previous top-tabbed-type seals. Thus, in some cases, commodity foams and foamed polymers may be used in the seals herein.

For simplicity, this disclosure generally refers to a container or bottle, but the sealing members herein may be applied to any type of container, bottle, package or other apparatus having a rim or mouth surrounding an access opening to an internal cavity. In this disclosure, reference to upper and lower surfaces and layers of the components of the sealing member refers to an orientation of the components as generally depicted in figures and when the sealing member is in use with a container in an upright position and having an opening at the top of the container. Different approaches to the sealing member will first be generally described, and then more specifics of the various constructions and materials will be explained thereafter. It will be appreciated that the sealing members described herein, in some cases, function in both a one-piece or two-piece sealing member configuration. A one-piece sealing member generally includes just the sealing member bonded to a container rim. A cap or closure may be also used therewith. A two-piece sealing member includes the sealing member temporarily bonded to a liner. In this construction, the sealing member is bonded to a container's rim, and the liner is configured to separate from the sealing member during heating to be retained in a cap or other closure used on the container. In a two-piece construction, a wax layer, for example, may be used to temporarily bond the sealing member to a liner. Other types of releasable layers may also be used to provide a temporary bond between the seal and liner.

Figure 1:
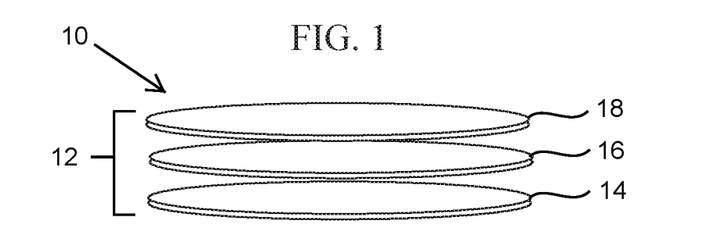
FIG. 1 is an exploded cross-sectional view of a sealing member.

Turning to more of the details and as generally shown in the figures, tabbed sealing members are shown. In FIG. 1, a non-tabbed sealing member 10 is provided as a laminate 12 formed from flexible sheet materials with a lower sealing layer 14 for bonding to a container's rim (not shown) and polymer foam 16. The sealing member 10 may also include a release layer 18. The release layer 18 may be useful when the sealing member is in a roll form, prior to cutting into individual seals. The release layer 18 may help prevent the lower sealing layer 14 from adhering to other portions of the sealing member, such as a top surface of the polymer foam 16, while being unrolled.

Figure 2:
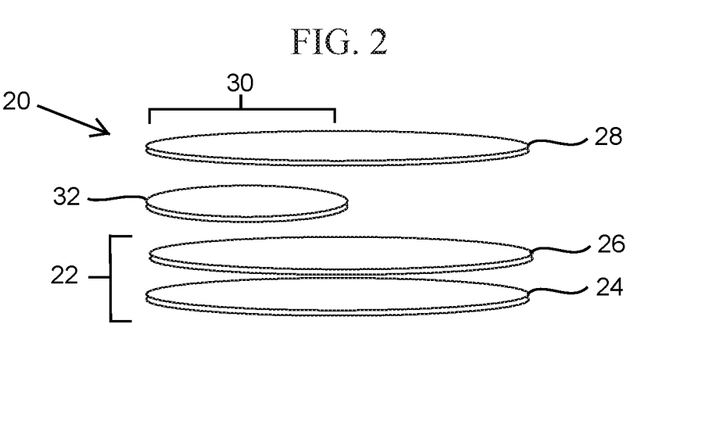
FIG. 2 is an exploded cross-sectional view of a tabbed sealing member.

It should be appreciated that the sealing member 10 shown in FIG. 1 is not tabbed. If the sealing member 10 were to be modified to be tabbed, a tabbed sealing member may result, such as shown in FIG. 2. Tabbed sealing member 20 includes a lower laminate 22 having a sealing layer 24 and a polymer foam layer 26, but does not include a release layer. Instead, the sealing member 20 may include a polymer layer 28 that can form part of a tabbed portion 30. A sub-tab 32 can be positioned between the polymer layer 28 and the polymer foam 26 and adhered to only one of these layers. For example, the sub-tab 32 can be adhered to the polymer layer 28, but not adhered to the polymer foam layer 26. A portion of the polymer layer 28 that is not adhered to the sub-tab 32 may then be adhered to the polymer foam layer 26.

Figure 3:
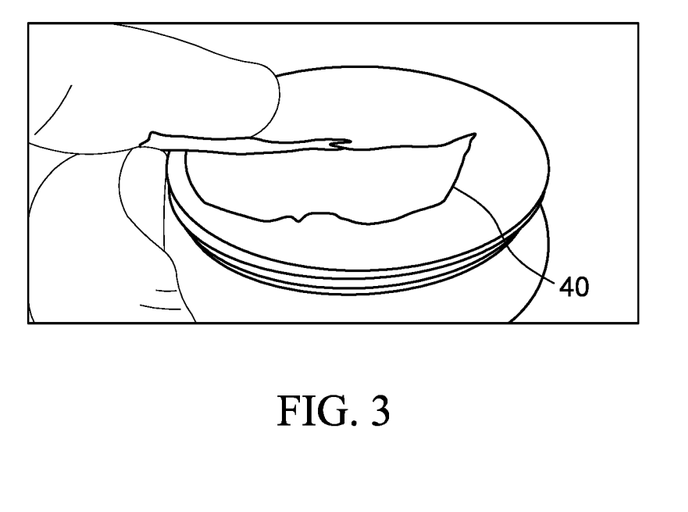
FIG. 3 is a picture of a sealing member as it is being removed from a container.

It should be appreciated that the gripping tab 30 is defined wholly within a perimeter of the tabbed sealing member 20. In use, by pulling on the tab 30, a user can pivot the tab upwardly and use the tab 30 to remove the sealing member 20 from a container rim or other container portion. However, in this configuration, the polymer foam layer 26 is susceptible to failure during seal removal. More specifically, the polymer foam layer 26 typically has weak inner strength such that it will tear and/or internally rupture. One example of this is shown in FIG. 3. As seen in FIG. 3, a large portion of the sealing member, as shown at reference 40, remains adhered to the container and the sealing member otherwise tears internally relative to the container lip as the sealing member is removed from the container. This may be undesirable as a user will then have to attempt to remove the torn portions from the container. This adds extra steps and otherwise may leads to an undesired appearance.

Figure 4:
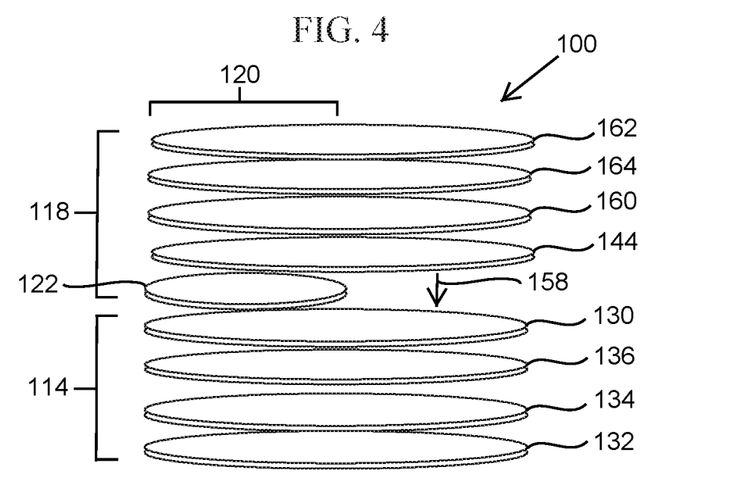
FIG. 4 is an exploded cross-sectional view of a tabbed sealing member with an added film layer.

Another form of tabbed sealing member is shown in FIG. 4. In one approach, and as generally shown in the exploded cross section view of FIG. 4, a tabbed sealing member 100 having a lower seal laminate portion 114 and an upper seal laminate portion 118 is provided with a structure including a foamed polymer layer in the lower laminate portion 114. The upper laminate 118 forms a tab structure 120 via a sub-tab 122, and the lower seal laminate 114 can be bonded or welded to a rim of a container as needed. The sub-tab 122 may extend only part way across the surface of the seal and may be made from a variety of different materials, such as a variety of different polymers. In one form, the sub-tab 122 is a PET film. Further, the sub-tab may include a silicone coating to help release from the lower laminate 114. The sub-tab 122 helps to form the tab 120 because it bonds to the upper laminate 118 and generally prevents the layers above from adhering to the lower seal laminate 114 across at least a portion thereof. While the relative dimensions of the sub-tab 122 are not particularly limited, in some cases the sub-tab 122 lies wholly within a circumference or perimeter of the seal 100 and/or lower laminate 114 and, typically, the sub-tab 122 occupies about 25 to about 50 percent of surface area of the sealing member 100. In one aspect, the sub-tab is formed of polyester, such as polyethylene terephthalate (PET), or paper.

The lower seal laminate 114 may be a laminate or multi-layer sheet including, by one approach, a top layer 130, a lower sealing layer 132 effective to secure or bond the seal member 100 to a container rim during a sealing process, and a polymer foam layer 134. In one approach, the sealing layer 132 is a pressure sensitive adhesive. Such pressure sensitive adhesives may include about 0.2 to about a 0.5 mil (or less) adhesive, such as a coated ethylene vinyl acetate (EVA), polyolefins, 2-component polyurethane, ethylene acrylic acid copolymers, curable two part urethane adhesives, epoxy adhesives, ethylene methacrylate copolymers and the like bonding materials.

Further, the polymer foam layer 134 may include a variety of different materials. In one form, the polymer foam layer 134 may be polystyrene foam, polypropylene, low density polyethylene, and polyester foams. These foams generally have a much lower internal rupture strength of about 2000 to about 3500 g/in. In some approaches, the foamed polymer layer may also have a density less than 0.6 g/cc and, in some cases, about 0.4 to less than about 0.6 g/cc. In other approaches, the density may be from about 0.4 g/cc to about 0.9 g/cc. Thus, even with the internally weaker foamed layers, the structure of the seals herein generally achieves a relatively high internal strength in the context of tabbed sealing members mentioned above. In a preferred form, the polymer foam is polystyrene foam.

It should be appreciated that the lower seal laminate 114 may include any number of other layers, such as polymer layers, adhesives, polymer films, polymer foams and the like. In one form, the top layer 130 is a polymer film configured to provide support to the polymer foam layer 134 and help avoid rupture of the polymer foam layer 134 during removal of the sealing member 100. According to one form, the top layer 130 is a polyethylene film.

In one form, an adhesive 136 may be used to bond the polymer foam layer 134 with the top layer 130. Such an adhesive may include materials such as polyurethane adhesive. Other suitable adhesives may include for example, ethylene vinyl acetate (EVA), polyolefins, 2-component polyurethane, ethylene acrylic acid copolymers, curable two part urethane adhesives, epoxy adhesives, ethylene methacrylate copolymers and the like bonding materials. Other suitable materials may include low density polyethylene, ethylene-acrylic acid copolymers and ethylene methacrylate copolymers. By one approach, any optional adhesive layers may be a coated polyolefin adhesive layer.

Figure 5:
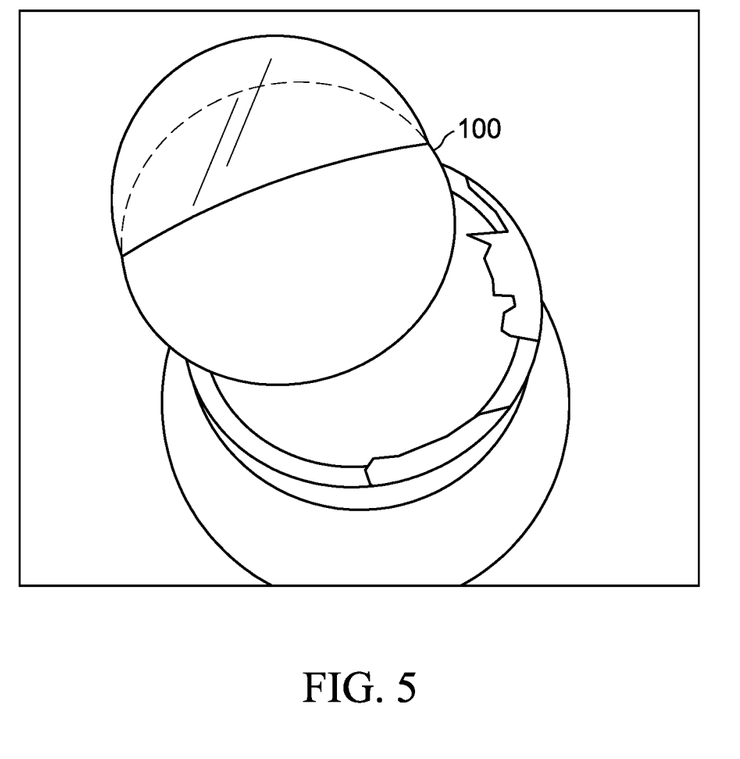
FIG. 5 is a picture of a tabbed sealing member as it is being removed from a container.

In many sealing members, a polymer foam layer may be included with a thickness of about 20 mils. In the configuration described for sealing member 100, the top layer 130, such as a polyethylene film, may allow thinner foam layers to be used. In one form, the polymer foam layer 134 may have a thickness of about 10 to about 20 mils. By using a thinner foam, the sealing member may maintain fracture and debris central to the land region of the container or vessel. For example, FIG. 5 depicts sealing member 100 being removed from a container. As shown in this figure, debris is generally maintained on the land region and there is little tearing or fracturing of the foam layer central relative to the land area.

Additional layers may be included in the upper and/or lower laminate such as polyethylene terephthalate (PET), nylon, or other structural polymer layer and may be, in some approaches, about 0.5 to about 1 mil thick. In some approaches, additional layers may be included in the lower laminate.

The upper laminate 118 of this approach defines the tab structure 120 and may also be a laminate or multi-layer sheet that defines or includes a pull tab or free tab 120 of the tab structure 120. By one approach, the free tab 120 is formed wholly within a circumference or perimeter of the sealing member 100 or the lower seal laminate 114 as generally shown in FIG. 4. In this approach, the upper laminate 118 may include a bonding layer 144 capable of forming a partial bond 158 between the upper laminate 118 and the lower laminate 114, which also forms the tab 120.

Above the bonding layer 144 may be one or more layers that can perform a variety of functions, such as providing support, displaying indicia or base for ink, providing a grippable surface, and the like. For example, the upper laminate 118 can include a first polymer layer 160 and a second polymer layer 162. The polymer layers 160,162 may be adhered together in a variety of manners, such as via adhesive 164. As indicated above, the adhesive can include a variety of different adhesives. In one form, adhesive 164 may be a polyurethane adhesive.

The polymer layers may take a variety of forms such as coatings, films, foams, and the like. Suitable polymers include but are not limited to, polyethylene, polypropylene, ethylene-propylene copolymers, blends thereof as well as copolymers or blends with higher alpha-olefins. By one approach, one or more of the polymer layers may be a blend of polyolefin materials, such as a blend of one or more high density polyolefin components combined with one or more lower density polyolefin components. In one form, polymer layer 160 may be a polyethylene film while polymer layer 162 may be a PET film. According to one form, the polyethylene film may have a thickness of about 5 to about 20 microns while the PET film may have a thickness of about 5 to about 20 microns.

Further, one or more of polymer layers 160,162 may be transparent and embossed or otherwise be provided with a surface roughness. By embossing the polymer layer(s), the non-smooth resulting surface may help impart desired roll release properties to the laminate and help minimize blocking when it is unwound prior to cutting into individual seals. Further, the grain or surface roughness, in some approaches, tends to reduce the surface contact between the outer layer 162 and any liner or cap applied over the sealing member 100. This grain or surface roughness tends to result in a reduction in removal force of a cap or adjacent liner (in a two-piece seal) in view of the decreased surface contact between the outer layer 162 and any adjacent surface cap or liner surface.

Further, the upper laminate 118 may be include printing, such as between one or more of the layers such that ink transfer may be reduced when formed into a roll. In this regard, polymer layer 162 may be used to help minimize ink transfer by covering ink that may be positioned on layer 160. The upper laminate 118 may also include other layers as needed for a particular application, which may be layers in between the various layers discussed herein.

In yet another form, a polymer foam layer may be included in the upper laminate 118. In this form, a polymer foam layer may or may not be included in the lower laminate 114. When a foam layer is included in the upper laminate, a polymer layer, such as polymer layer 160 should be positioned between the lower laminate 114 and the foam layer. In this regard, the polymer layer 160 may provide strength to the foam layer in the upper laminate and otherwise help prevent rupture or tearing of the foam layer.

The various layers of the sealing member are assembled via coating adhesives, applying films, and/or a heat lamination process forming a sheet of the described layers. Extrusion lamination may also be used. The resulting laminate sheet of the sealing members can be cut into appropriate sized disks or other shapes as needed to form a vessel closing assembly or tabbed sealing member. The cut sealing member is inserted into a cap or other closure which, in turn, is applied to the neck of a container to be sealed. The screw cap can be screwed onto the open neck of the container, thus sandwiching the sealing member between the open neck of the container and the top of the cap. The sealing layer may be a pressure sensitive adhesive, the force of attaching the closure to the container can activate the adhesive.

It will be understood that various changes in the details, materials, and arrangements of the process, liner, seal, and combinations thereof, which have been herein described and illustrated in order to explain the nature of the products and methods, may be made by those skilled in the art within the principle and scope of the embodied product as expressed in the appended claims. For example, the seals may include other layers within the laminate as needed for a particular application. Adhesive layers not shown in the Figures may also be used, if needed, to secure various layers together.

What is claimed is:

1. A tabbed sealing member for sealing to a rim of a container, the tabbed sealing member comprising:
   a lower laminate including a bottom pressure sensitive sealable layer configured for sealing the tabbed sealing member to a container rim;
   a foamed polymer layer positioned in the lower laminate above the pressure sensitive sealable layer;
   a non-foamed polymer layer positioned in the lower laminate above the foamed polymer layer; and
   an upper laminate at least partially bonded to the lower laminate to form a gripping tab defined within a perimeter of the lower laminate.

2. The tabbed sealing member of claim 1 wherein the upper laminate includes a polymer layer having an embossed surface.

3. The tabbed sealing member of claim 1 wherein the foamed polymer layer is polystyrene foam having a thickness from about 10 to about 20 mils.

4. The tabbed sealing member of claim 1 wherein non-foamed polymer layer is selected from the group consisting of polyethylene, polypropylene, ethylene-propylene copolymers and blends thereof.

5. The tabbed sealing member of claim 1 further comprising at least two non-foamed polymer layers in the upper laminate, a first layer comprising PET film and a second layer comprising polyethylene film.

6. The tabbed sealing member of claim 1 wherein the pressure sensitive sealable layer is activated to seal to the rim of the container when a cap is screwed on to the container.

7. The tabbed sealing member of claim 1 wherein the pressure sensitive sealable layer has a thickness of about 0.2 to about 0.5 mil.

8. The tabbed sealing member of claim 1 wherein the foamed polymer is bonded on a first side to the pressure sensitive sealable layer and on an opposite side to the non-foamed polymer layer, the upper laminate being bonded to the non-foamed polymer layer to form the gripping tab.

9. The tabbed sealing member of claim 1 wherein the pressure sensitive sealable layer comprises coated ethylene vinyl acetate.

10. A tabbed sealing member for sealing to a rim of a container, the tabbed sealing member comprising:
    a lower laminate including a bottom pressure sensitive sealable layer configured for sealing the tabbed sealing member to a container rim;
    an upper laminate at least partially bonded to the lower laminate to form a gripping tab defined within a perimeter of the lower laminate;
    a foamed polymer layer positioned in the upper laminate above the pressure sensitive sealable layer; and
    a non-foamed polymer layer positioned in the upper laminate between the foamed polymer layer and the lower laminate.

11. The tabbed sealing member of claim 10 wherein the upper laminate includes a polymer layer having an embossed surface.

12. The tabbed sealing member of claim 10 wherein the foamed polymer layer is polystyrene foam having a thickness from about 10 to about 20 mils.

13. The tabbed sealing member of claim 10 wherein non-foamed polymer layer is selected from the group consisting of polyethylene, polypropylene, ethylene-propylene copolymers and blends thereof.

14. The tabbed sealing member of claim 10 further comprising at least two non-foamed polymer layers, a first layer comprising PET film and a second layer comprising polyethylene film.

15. A laminated structure for forming a tabbed sealing member, the laminated structure comprising:
    a lower laminate including a bottom pressure sensitive sealable layer configured for sealing the tabbed sealing member to a container rim;
    a foamed polymer layer positioned in the lower laminate above the pressure sensitive sealable layer;
    a non-foamed polymer layer positioned in the lower laminate above the foamed polymer layer; and
    an upper laminate at least partially bonded to the lower laminate to form a gripping tab defined within a perimeter of the lower laminate.

16. The laminated structure of claim 15 wherein the upper laminate includes a polymer layer having an embossed surface.

17. The laminated structure of claim 15 wherein the foamed polymer layer is polystyrene foam having a thickness from about 10 to about 20 mils.

18. The laminated structure of claim 15 wherein non-foamed polymer layer is selected from the group consisting of polyethylene, polypropylene, ethylene-propylene copolymers and blends thereof.

19. The laminated structure of claim 15 further comprising at least two non-foamed polymer layers, a first layer comprising PET film and a second layer comprising polyethylene film.

20. A laminated structure for forming a tabbed sealing member, the laminated structure comprising:
    a lower laminate including a bottom pressure sensitive sealable layer configured for sealing the tabbed sealing member to a container rim;
    an upper laminate at least partially bonded to the lower laminate to form a gripping tab defined within a perimeter of the lower laminate;
    a foamed polymer layer positioned in the upper laminate above the pressure activated sealable layer; and
    a non-foamed polymer layer positioned in the upper laminate between the foamed polymer layer and the lower laminate.

21. The laminated structure of claim 20 wherein the upper laminate includes a polymer layer having an embossed surface.

22. The laminated structure of claim 20 wherein the foamed polymer layer is polystyrene foam having a thickness from about 10 to about 20 mils.

23. The laminated structure of claim 20 wherein non-foamed polymer layer is selected from the group consisting of polyethylene, polypropylene, ethylene-propylene copolymers and blends thereof.

24. The laminated structure of claim 20 further comprising at least two non-foamed polymer layers, a first layer comprising PET film and a second layer comprising polyethylene film.

25. A tabbed sealing member for sealing to a rim of a container, the tabbed sealing member comprising:
    a lower laminate including a bottom pressure sensitive sealable layer configured for sealing the tabbed sealing member to a container rim;

a foamed polymer layer positioned in the lower laminate above the pressure sensitive sealable layer, the foamed polymer layer being polystyrene;

a non-foamed polymer layer positioned in the lower laminate above the foamed polymer layer; and an upper laminate at least partially bonded to the lower laminate to form a gripping tab defined within a perimeter of the lower laminate.

\* \* \* \* \*